United States Patent [19]

Slater et al.

[11] 4,007,017
[45] * Feb. 8, 1977

[54] PRODUCTION OF CLEAN SYNTHESIS OR FUEL GAS

[76] Inventors: William L. Slater; George N. Richter; William B. Crouch; Lawrence E. Estabrook, all of c/o Texaco Inc. P.O. Box 400, Montebello, Calif. 90640

[ * ] Notice: The portion of the term of this patent subsequent to Feb. 8, 1994, has been disclaimed.

[22] Filed: Dec. 22, 1975

[21] Appl. No.: 643,069

[52] U.S. Cl. .............................. 48/197 R; 48/200; 48/215; 252/373
[51] Int. Cl.² ...................... C10J 3/00; C10K 1/08
[58] Field of Search ........ 48/215, 212, 200, 197 R; 252/373

[56] References Cited
UNITED STATES PATENTS

| | | | |
|---|---|---|---|
| 3,620,700 | 11/1971 | Schlinger et al. | 48/215 |
| 3,639,261 | 2/1972 | Slater | 48/215 |
| 3,816,332 | 6/1974 | Marion | 48/215 |
| 3,929,429 | 12/1975 | Crouch | 48/215 |

*Primary Examiner*—Robert L. Lindsay, Jr.
*Assistant Examiner*—George C. Yeung

[57] ABSTRACT

An improved continuous partial oxidation process for producing clean synthesis or fuel gas from a hydrocarbonaceous fuel feed is disclosed wherein the effluent gas stream from the reaction zone of the gas generator is simultaneously cooled and cleaned by first discharging the gas stream directly into a relatively large body of hot liquid hydrocarbon immersion fluid contained in an immersion vessel, and second by scrubbing with by-product water obtained subsequently in the process in a nozzle scrubber. The process gas stream is optionally cooled and passed into a gas-liquid separator where any condensed by-product noxious water and any $C_5$-$C_{10}$ liquid hydrocarbons are separated from each other and from the clean product gas stream. By-product noxious water is disposed of without polluting the environment by recycling a portion of it to the gas generator as the temperature moderator. For example, the immersion fluid may be a dispersion of liquid hydrocarbonaceous fuel such as petroleum oil and particulate carbon which is contained in a separate immersion vessel. A portion of the hot immersion fluid is continuously removed from the immersion vessel and is cooled in an external gas cooler to a temperature in the range of about 300° to 850° F but above the dew point of the water in the process gas stream. Portions of the cooled immersion fluid are recycled to the immersion vessel, and optionally to the gas generator as at least a portion of the hydrocarbonaceous fuel feed. In another embodiment, a portion of the immersion fluid removed from the immersion vessel may be introduced into the gas generator as at least a portion of the feed without first being passed through a cooler. The clean product gas comprises $H_2$, CO, $CO_2$, $H_2O$ and, optionally at least one material from the group $H_2S$, COS, $N_2$, A, and $C_1$-$C_4$ hydrocarbons.

11 Claims, 1 Drawing Figure

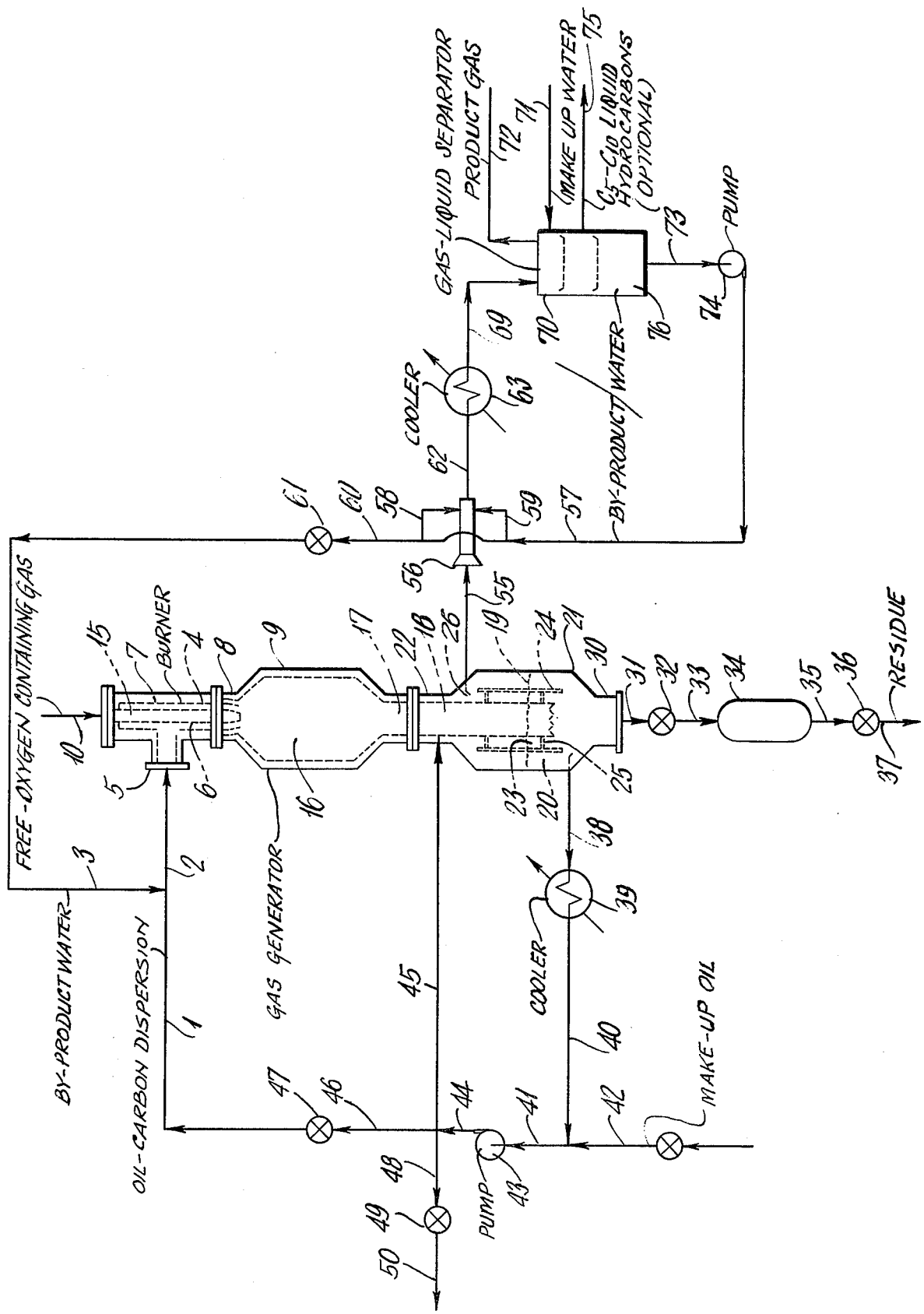

PRODUCTION OF CLEAN SYNTHESIS OR FUEL GAS

BACKGROUND OF THE INVENTION

1. Field of the Invention

This invention relates to a continuous process for the production of fuel gas or synthesis gas by the partial oxidation of a hydrocarbonaceous fuel. More specifically, the present invention pertains to an improved procedure for producing cooled and cleaned gas mixtures comprising hydrogen and carbon monoxide while simultaneously disposing of by-product noxious water without polluting the environment.

2. Description of the Prior Art

Liquid hydrocarbon fuels have been gasified with oxygen in the presence of steam to produce a mixture of gaseous products comprising carbon monoxide and hydrogen. For example, reference is made to coassigned U.S. Pat. No. 2,809,104 - D. M. Strasser et al., where the effluent gas stream from the reaction zone is cooled by quenching in water. Scrubbing a precooled gas stream with an oil-water emulsion containing about 10 to 90 volume % water is described in coassigned U.S. Pat. No. 3,010,813 - L. A. Clarke et al.

By quenching the effluent gas stream containing entrained particulate carbon in water or in emulsions containing large amounts of water, large amounts of $H_2O$ will be introduced into the gas stream which may be costly to remove. Further, dispersions of particulate carbon and water are produced which require complex systems to separate the carbon from the water.

By the subject invention traditional costly carbon removal systems may be eliminated and the waste water treatment facilities now required to meet water disposal standards may be simplified.

SUMMARY

The subject invention pertains to a continuous process for producing clean synthesis or fuel gas mixtures comprising $H_2$, CO, $CO_2$, $H_2O$ and optionally at least one material from the group $H_2S$, COS, $N_2$, A, and $C_1$–$C_4$ hydrocarbons while simultaneously consuming by-product noxious water. The process steps include the following:

1. introducing into the reaction zone of a freeflow unpacked gas generator as feed a liquid dispersion of particulate carbon and liquid hydrocarbonaceous fuel, a stream of free-oxygen-containing gas, and a temperature moderator comprising at least a portion of the by-product water produced subsequently in the process, and reacting said materials at a temperature in the range of about 1300° to 3000° F and a pressure in the range of about 1 to 250 atmospheres thereby producing an effluent gas stream comprising $H_2$, CO, $CO_2$, $H_2O$, particulate carbon, and optionally at least one material from the group $H_2S$, COS, $N_2$, A, and $CH_4$;

2. cooling the effluent gas stream from (1) to a temperature in the range of about 300° to 900° F but above the dew point of the water in the gas stream and simultaneously removing said particulate carbon entrained in said gas stream by discharging said effluent gas steam directly into a body of hot immersion fluid contained in a quench zone and comprising a dispersion of liquid hydrocarbonaceous fuel and particulate carbon and removing from said quench zone a clean gaseous stream comprising $H_2$, CO, $CO_2$, $H_2O$, particulate carbon, and optionally at least one material from the group $H_2S$, COS, $N_2$, A, and $C_1$–$C_{10}$ hydrocarbons;

3. contacting the process gas stream leaving the quench zone in (2) in a gas-liquid contacting zone with a portion of by-product water to remove any remaining particulate carbon and optionally cooling the gas stream in a cooling zone to condense out any entrained normally liquid $C_5$–$C_{10}$ hydrocarbons and water, and separating the following streams in a gas-liquid separation zone: (a) by-product water, (b) light liquid $C_5$–$C_{10}$ hydrocarbons, and (c) clean product gas comprising $H_2$, CO, $CO_2$, and optionally at least one material from the group $H_2S$, COS, $N_2$, A, and $C_1$–$C_4$ hydrocarbons;

4. recycling separate portions of the by-product water (3) optionally in admixture with make-up water, to the reaction zone in the gas generator in (1) and to the gas-liquid contacting zone in (3);

5. cooling the immersion fluid from (2) to a temperature in the range of about 300° to 850° F in an external cooler, and recycling at least a portion of said cooled immersion fluid to said quench zone; and 6. introducing a portion of said hot immersion fluid from (2) or a portion of said cooled immersion fluid from (5) into said gas generator as at least a portion of said feed.

In another embodiment of the invention, the effluent gas stream from the gas generator in step (1) may be sprayed with a portion of the cooled immersion fluid from step (5) prior to said effluent gas stream being submerged in said large body of immersion fluid in step (2).

$C_1$–$C_{10}$ hydrocarbon vapors may be obtained by thermal cracking or volatilizing a portion of the immersion fluid either during quenching of the hot effluent gas stream in the quench zone or during the optional step of spraying the effluent gas stream from the gas generator with cooled immersion fluid prior to said quenching. $C_5$–$C_{10}$ hydrocarbons that may be entrained in the effluent gas stream may be condensed by cooling and thereby separated from the gas stream along with the by-product water scrubbing fluid. Any $C_5$–$C_{10}$ hydrocarbons may be fed to the generator.

DESCRIPTION OF THE INVENTION

By the present process, cooled and cleaned synthesis gas or fuel gas may be produced while simultaneously consuming noxious by-product water.

The gas generator for carrying out the partial oxidation reaction in the subject process preferably consists of a compact, unpacked, free-flow, non-catalytic, refractory-lined steel pressure vessel of the type described in said coassigned U.S. Pat. No. 2,809,104 - Dale M. Strasser et al.

The feed streams may be simultaneously introduced into the gas generator by means of a suitable mixer. For example, by means of a typical burner, the separate streams of reactants are brought together to produce a uniform mixture which is then reacted by partial oxidation in the reaction zone of the gas generator. The burners consist in general of a plurality of concentrically arranged tubes. At the burner tip, the reactant streams converge to form a mist of finely dispersed fuel particles in free-oxygen-containing gas and temperature moderator.

Suitable single annulus-type burners are described in coassigned U.S. Pat. No. 2,928,460 - DuBois Eastman et al and suitable double annulus-type burners are described in coassigned U.S. Pat. No. 3,847,564 - C. P.

Marion and B. Reynolds. The burner is preferably mounted in the upper port of the gas generator along the vertical axis with the tip of the burner extending into the reaction zone.

The reaction time in the gas generator is in the range of about 1 to 10 seconds and preferably in the range of about 2 to 8 seconds.

A free-oxygen containing gas is introduced into the reaction zone of the gas generator, preferably by way of the center passage of the burner. The term "free-oxygen containing gas" as used herein is intended to include air, oxygen-enriched air, i.e. at least 22 mole % oxygen, and substantially pure oxygen, i.e. at least 95 mole % oxygen (the remainder comprising $N_2$ and rare gases).

The free-oxygen containing gas is introduced into the reaction zone at a temperature in the range of about ambient to 1800° F, and preferably in the range of about 200° to 300° F, and a pressure in the range of about 1 to 250 atmospheres. The ratio of free-oxygen in the oxidant to carbon in the feedstock (O/C atom/atom) is in the range of about 0.6 to 1.5. Substantially pure oxygen is preferred to minimize introducing nitrogen and other gaseous impurities into the product gas.

The term "liquid hydrocarbonaceous fuel" as used herein is intended to mean by definition petroleum distillate and residua, gas oil, residual fuel, reduced crude, whole crude, asphalt, coal tar, coal oil, shale oil, tar sand oil, and mixtures thereof. Thermally cracked and vaporized constituents thereof comprising normally liquid $C_5$–$C_{10}$ hydrocarbons are also by definition "liquid hydrocarbonaceous fuels." An economic advantage is obtained when low cost sulfur-containing petroleum oils with a sulfur content in the range of about 1 to 7 weight % are used.

Pumpable slurries of solid carbonaceous fuels, e.g. particulate carbon, petroleum coke, and mixtures thereof in a liquid hydrocarbonceous fuel such as one previously listed, may also be fed to the gas generator and are included within the definition of liquid hydrocarbonaceous fuel.

The liquid hydrocarbonaceous fuel may be preferably introduced into the gas generator in a liquid phase in admixture with by-product water at a temperature in the range of ambient to below the vaporization temperature. Alternately, the hydrocarbonaceous fuel feed may be atomized and dispersed in steam or some other temperature moderator.

By-product water is preferably supplied in liquid phase, but it may be introduced as steam. The weight ratio of water to liquid hydrocarbonaceous fuel is in the range of about nil to 3.0 and preferably about 0.25 to 0.75. Alternatively, the by-product water or steam may be introduced into the reaction zone through a separate passage in the burner, e.g. outer annular passage. Alternatively, portions of $H_2O$ may be introduced in admixture with either the free-oxygen containing gas, the liquid hydrocarbonaceous fuel, or both.

A preferred feedstock to the gas generator comprises fresh liquid hydrocarbonaceous fuel that is mixed with immersion fluid comprising about nil to 50 weight % of particulate carbon dispersed in hydrocarbonaceous fuel. An oil-carbon dispersion is produced thereby which may be then mixed with by-product water at a temperature in the range of ambient to below its boiling point as produced subsequently in the process. Preferably, a mixture of by-product water and make-up water is preheated to a temperature below its boiling point by scrubbing the effluent gas stream from the quench zone. Since the by-product water may contain sulfur compounds, cyanides, and noxious organic materials, consuming the by-product water as a temperature moderator in the gas generator is a convenient way of disposing of this noxious material without polluting the environment.

The effluent gas stream from the gas generator has the following composition in mole %: $H_2$ 10 to 60; CO 10 to 70; $CO_2$ 1 to 50; $H_2O$ 2 to 50; $CH_4$ nil to 30; $N_2$ nil to 75; $H_2S$ nil to 2.0; COS nil to 0.7; A nil to 2; and from 0.2 to 20 weight % of particulate carbon (basis weight of C in the hydrocarbonaceous fuel).

The effluent gas stream leaving the gas generator is passed directly into a relatively large body of pumpable immersion fluid contained in a cooling and cleaning zone.

In a preferred embodiment the process gas stream is introduced below the surface of a pool of liquid hydrocarbonaceous fuel-particulate carbon dispersion contained in an immersion or quench tank. The oil immersion tank preferably comprises a vertical tank with an axially disposed dip leg. The process gas stream is passed through the dip leg and is discharged beneath the surface of a pool of the liquid hydrocarbonaceous fuel contained in the steel pressure vessel. A concentric draft tube open on both ends may surround the dip leg, producing an annulus passage therebetween. In operation, the direction of the downflowing process gas stream may be reversed thereby and a mixture of gas and cooling fluid may then pass up through said liquid hydrocarbon. The gas then separates in the space above the surface level of the immersion fluid near the top of the oil immersion tank. About 30 to 60 gallons of immersion fluid are contained in the immersion tank for each 1000 Standard Cubic Feet of effluent gas from the gas generator being quenched therein.

The turbulent condition in the oil immersion tank, caused by the large volumes of gases bubbling up through said annular space, helps the immersion fluid to scrub substantially all of the solids from the effluent gas, forming a dispersion of unconverted particulate carbon and immersion fluid. Thus, as used herein, the term "immersion fluid" is intended to mean either the mixtures of liquid hydrocarbonaceous fuels or a pumpable dispersion of liquid hydrocarbonaceous fuels and particulate carbon. The solids content in weight % of this oil-carbon pumpable dispersion is in the range of about 1.0 to 50.0 and preferably in the range of about 2.0 or 8.0. For a detailed description of a conventional quench chamber, reference is made to coassigned U.S. Pat. No. 2,896,927 - R. E. Nagle et al, which is herewith incorporated by reference.

The cooled clean process gas stream leaving the immersion fluid has an exit temperature in the range of about 300° to 900° F, and preferably a temperature in the range of about 600° to 750° F. The lower temperature should be above the dew point of water in the gas stream to prevent condensation of water in the process gas stream and in the oil immersion tank. The time in the immersion zone is about 5 to 60 seconds. The effluent gas stream leaving the immersion zone comprises $H_2$, CO, $CO_2$, $H_2O$, and optionally at least one material from the group $H_2S$, COS, $N_2$, A, particulate carbon, and $C_1$–$C_{10}$ hydrocarbons. There may be about nil to 40 mole % of $C_1$–$C_{10}$ hydrocarbons which may result from thermal cracking or volatilization of the immersion fluid.

The immersion fluid may be maintained at a temperature in the range of about 300° to 850° F and preferably about 600° to 750° F. The pressure in the quench zone is in the range of about 1 – 250 atmospheres and preferably the same as in the gas generator. A pressure in the range of about 3 to 250 atmospheres is suitable. When it is desirable to minimize volatilization of the immersion fluid, higher pressures may be used, i.e. 1500 psia and above. The minimize $C_1$–$C_4$ gaseous hydrocarbons in the product gas, the upper temperature of the immersion fluid should be kept below the thermal cracking temperature. By cooling below the liquefaction temperature normally liquid $C_5$–$C_{10}$ hydrocarbons may be separated from the product gas stream. Optionally, a portion of the hot immersion fluid may be removed from the immersion tank at a temperature in the range of about 300° to 900° F and at substantially the same temperature may be introduced into the gas generator as feed thereto. In this manner the immersion tank serves as a fuel preheater.

The liquid hydrocarbon immersion fluid is pumpable at the operating conditions existing in the quench tank. The liquid hydrocarbonaceous fuels which were previously described as feedstock for the gas generator, and the immersion fluid are substantially the same type of materials.

The temperature of the immersion fluid may be controlled by the steps of removing hot immersion fluid from the quench tank at a temperature in the range of about 300° to 900° F, cooling it for example in a cooler to a temperature in the range of about 300° to 850° F, but above the dew point of water in the effluent gas stream from the gas generator to prevent water from condensing out in the quench tank and forming troublesome emulsions, and below the boiling point of the immersion fluid at the existing pressure, and recycling to the quench tank a portion of said cooled immersion fluid in admixture with make-up liquid hydrocarbonaceous fuel. Optionally, a portion of the cooled immersion fluid mixture may be recycled to the gas generator as feed. Optionally, a portion of the immersion fluid mixture may be removed and burned elsewhere as fuel.

In another embodiment of the invention, a portion of said immersion fluid mixture at a temperature in the range of about 300° to 850° F. is sprayed into the effluent gas stream prior to said gas stream being discharged into said large body of hot immersion fluid. By this means the effluent gas stream will be partially cooled by supplying heat to vaporize and partially crack at least a portion of the immersion fluid.

At start-up, the immersion fluid may have to be heated by conventional means to a temperature that is above the dew point for $H_2O$ in the effluent gas stream from the gas generator.

Solid materials, such as ash and heavy metal constituents, i.e. nickel and vanadium, and their reaction products are periodically removed from the bottom of the oil immersion tank by way of a conventional lock hopper system such as described in coassigned U.S. Pat. No. 3,544,291 - W. Schlinger et al, or by filtration.

The cleaned and cooled process gas stream leaving from the top of the oil immersion tank is at a temperature above the dew point of the water in the gas stream and in the range of about 300° to 900° F, and preferably about 600° to 750° F.

Residual solids contained in the gas stream may be removed by passing the gas stream through a nozzle scrubber. A conventional orifice or venturi scrubber may be employed. The pumpable scrubbing fluid comprises by-product water collected subsequently in the process in admixture with fresh make-up water. For example, the process gas stream may be passed through the throat of a nozzle-type scrubber at a velocity in the range of about 100–400 feet per second. About 5 to 10 gallons of said by-product water scrubbing fluid per 1,000 standard cubic feet of gas are injected into the process gas stream at the throat of the scrubbing nozzle. The process gas stream is then cooled below the dew points of the $H_2O$ and any vaporized normally liquid light hydrocarbons, i.e. $C_5$–$C_{10}$ that may be contained therein.

In a gas-liquid separator the product gas may be separated from the normally liquid constituents, i.e. water and $C_5$ – $C_{10}$ hydrocarbons present in the scrubbed gas stream.

Any $C_5$ – $C_{10}$ liquid hydrocarbons present will form a dispersion with the particulate carbon scrubbed from the gas stream. The dispersion separates out and floats on the by-product water layer that sinks to the bottom of the gas-liquid separator. If there is little or no $C_5$ – $C_{10}$ liquid hydrocarbons present, then the particulate carbon will form a dispersion with the by-product water.

Before leaving the gas-liquid separator, the process gas stream is washed with clean make-up water. The clean product gas leaving the gas-liquid separator may contain from about nil to 40 mole percent of $C_1$ – $C_4$ saturated and unsaturated normally gaseous hydrocarbons produced by thermal cracking of the immersion fluid. Other gaseous constituents include $H_2$, CO, $CO_2$, and optionally gaseous impurities selected from the group $N_2$, A, $H_2S$, COS, and mixtures thereof. For example, synthesis gas product may preferably contain from about nil to 5 mole % of $C_1$ – $C_4$ hydrocarbons, while fuel gas may preferably contain from 10 to 40 mole % of $C_1$ – $C_4$ hydrocarbons. The greater the amount of $C_1$ – $C_4$ hydrocarbons present, the higher the heating value of the product gas. Thus, for the same oxygen consumption in the gas generator, fuel gas may be produced by the subject process having a greater heating value i.e. B.T.U. per standard cubic feet (SCF) of about 400 to 800.

The amount of $C_1$ – $C_4$ hydrocarbons in the product gas is a function of the characteristics of the immersion fluid, and temperature of immersion fluid. Thermal cracking of the immersion fluid is controlled or minimized when synthesis gas is produced. In such case refractory oils such as residual aromatic oils having a minimum initial atmospheric pressure boiling point of 650° F, and low quench temperatures i.e. 300° to 500° F are preferred. However, when the product gas is fuel gas, thermal cracking of the immersion fluid in the immersion zone will increase the heating value of the gas.

If desired, additional conventional gas purification steps such as by solvent absorption or cryogenic cooling may be employed to eliminate any or all of the gaseous impurities from the product gas stream.

The by-product water in liquid phase separates by gravity from the product gas and any $C_5$–$C_{10}$ liquid hydrocarbons in the gas-liquid separator. A first portion of the by-product water in admixture with make-up water is recycled to the nozzle scrubber as scrubbing fluid, and a second portion is consumed in the gas generator as a temperature moderator, as previously described. Optionally, a third portion may be removed and used elsewhere in the system.

Any $C_5$–$C_{10}$ liquid hydrocarbons separated in the gas-liquid separator may be consumed in the gas generator as a portion of the feed.

Advantages of the subject process include: (1) elimination of the conventional carbon extraction facility employing naphtha for extracting carbon from carbon-water slurries followed by decanting and naphtha stripping; (2) production of synthesis gas or enriched fuel gas having a high B.T.U. per SCF; (3) increased thermal efficiency by employing heat from the effluent gas from the gas generator to preheat the oil feed to the gas generator; and (4) consumption in the process of noxious by-product water and particulate carbon without polluting the environment.

DESCRIPTION OF THE DRAWING AND EXAMPLE

A more complete understanding of the invention may be had by reference to the accompanying schematic drawing which shows the previously described process in detail. Quantities have been assigned to various streams so that the following descripton in Example I may also serve as an example of the subject invention.

EXAMPLE I

On an hourly basis about 2000 lbs. of an oil-carbon feed dispersion in line 1 at a temperature of about 300° F is passed into line 2 where it is mixed with 500 lbs. of by-product noxious water at a temperature of about 200° F from line 3. The by-product water acts as a temperature moderator in the ensuing reaction. The feed mixture in line 2 is passed through burner 4 by way of flanged inlet 5 and outer annulus 6. Burner 4 extends downwardly and axially into the upper flanged port of T shaped fitting 7, which is located in upper axial inlet 8 of conventional, vertical, cylindrical, free-flow, unpacked, noncatalytic, refractory-lined gas generator 9. The oil-carbon dispersion has a solids content of about 3.6 weight percent (wt.%) of particulate carbon. The oil in said dispersion comprises 15.0° API California Reduced Crude having the following ultimate analysis in wt. % : C 85.99; H 11.28; O 0.13; N 0.88; S 1.69 and Ash 0.03. The Heat Combustion of the oil is 18,514 BTU per lb.

Simultaneously, 2254 lbs. of substantially pure oxygen in line 10 at a temperature of about 300° F is passed through central passage 15 of burner 4. The reactant streams converge at the tip of the burner where atomization of the fuel and dispersal in the oxidant takes place.

In reaction zone 16 of refractory lined gas generator 9, at an autogenous temperature of about 2520° F and a pressure of about 28 atmospheres, partial oxidation of the fuel takes place. 107,600 standard cubic feet per hour (SCFH) of effluent gas leave the gas generator by way of axially located bottom flanged exit port 17 and directly passes down through dip tube 18 and is discharged below the surface 19 of the pool of oil-carbon dispersion 20 contained in vertical oil immersion vessel 21. Dip tube 18 is axially mounted in the top flanged inlet port 22. The direction of the process gas stream moving down dip tube 18 is reversed upon being discharged into the immersion fluid confined in vessel 21. The gas stream then passes vigorously up through the scrubbing fluid contained in the annular space 23 located between the outside surface of dip tube 18 and inside surface of open-ended concentric draft tube 24. Spacers 25 support draft tube 24 and position it with respect to dip tube 18. The turbulent action cools and cleans the gas stream which then separates from the immersion fluid in space 26 at the top of the immersion vessel at a temperature of about 500° F and below the thermal cracking and vaporization temperature at the existing pressure for the immersion fluid. The pressures in the immersion vessel and in the gas generator are substantially the same.

Solid residue, such as ash and heavy metal constituents, which separates from the gas stream sinks to the bottom of the oil-carbon dispersion in vessel 21 and is periodically removed through bottom axial flanged port 30. A conventional lock hopper system comprising line 31, valve 32, line 33, tank 34, line 35, valve 36 and line 37 facilitate the removal of the solids.

The temperature of the immersion fluid 20 is reduced by removing about 38,500 lbs. of the immersion fluid at a temperature of about 500° F and containing about 4.0 wt. % of particulate carbon through line 38. It is then passed through cooler 39 and lines 40–41. About 1,950 lbs. of fresh California Reduced Crude make-up fluid from line 42 are mixed in line 41 with said cooled immersion fluid from line 40. By means of pump 43, about 38,500 lbs. of this mixture of fluids at a temperature of about 300° F are pumped through lines 44 and 45 into the top of immersion vessel 21 as said immersion fluid. About 2,000 lbs. of the mixture of fluids in line 44 are passed through line 46, valve 47, and lines 1–2 as previously described. In another embodiment (not shown) cooler 39 may be located in line 45. In such instance, a portion of the hot mixture of fluid in line 44 may be introduced into gas generator 9 by way of lines 46, 1, and 2 as at least a portion of the feed without being substantially cooled. By this means make-up oil may be preheated by contact with hot immersion fluid. Optionally, a portion of the mixture of fluids in line 44 may be passed through line 48, valve 49, and line 50 and used as a heating fuel.

The process gas stream is removed from space 26 at the top of immersion vessel 21 and is passed through line 55 into conventional nozzle scrubber 56 where it is scrubbed with 8100 lbs. of by-product water scrubbing fluid from lines 57–59 in order to remove any entrained particulate carbon remaining in the process gas stream. Preferably, a portion of the by-product water may be passed through line 60, valve 61, and lines 3 and 2, as previously described. The process gas stream, in admixture with the scrubbing fluid is then passed through line 62 into cooler 63 where the temperature of the process stream is reduced to below the condensation temperature of water and any $C_5$ –$C_{10}$ hydrocarbons that may be present. From cooler 63 the process stream is passed through line 69 and into gas-liquid separator 70 where the product gas separates from the liquids present. Before leaving separator 70, the product gas receives a final scrubbing wih fresh make-up water at ambient temperature from line 71. Clean product gas is removed through line 72 at the top of separator 70. In this example there are substantially no $C_2$ –$C_{10}$ hydrocarbons in the product gas stream. This is because the temperature of the immersion fluid in immersion vessel 21 is maintained below the thermal cracking temperature and below the vaporization temperature for the existing pressure. The composition of the product gas in line 72 in mole % dry basis follows: $H_2$ 45.14; CO 51.30; $CO_2$ 2.62; $CH_4$ 0.22; $H_2S$ 0.38; COS 0.02; $N_2$ 0.24; and A 0.08.

Optionally, the product gas in line 72 may be fuel gas with a gross heating value in the range of about 400 to 700 BTU per SCF. This may be accomplished by operating quench tank 21 at a temperature above the thermal cracking temperature so that from about 10 to 40 mole % of $C_1$–$C_4$ gaseous hydrocarbons become mixed in the product gas.

A pumpable liquid dispersion scrubbing fluid comprising noxious by-product water in admixture with make-up water and 0.2 wt. % of particulate carbon at 76 is removed through line 73 at the bottom of separator 70. By means of pump 74, a first portion is passed through line 57 into nozzle scrubber 56. A second portion of the nozzle scrubbing fluid may be passed into line 60, valve 61, line 3 and mixed in line 2 with the oil-carbon dispersion from line 1, as previously described. Any $C_5$–$C_{10}$ liquid hydrocarbons may be drawn off through line 75 and burned in the gas generator as a portion of the feed.

The process of the invention has been described generally and by example with reference of clarity and illustration only. It will be apparent to those skilled in the art from the foregoing that various modifications of the process and the materials disclosed herein can be made without departure from the spirit of the invention.

We claim:

1. A continuous process for producing clean gaseous mixtures comprising $H_2$, CO, $CO_2$, $H_2O$, and optionally at least one gas from the group $H_2S$, COS, $N_2$, A, and $C_1$–$C_4$ hydrocarbons, while simultaneously disposing of by-product water produced by the process comprising:
   1. reacting in the reaction zone of a free-flow, unpacked gas generator as feed a dispersion of particulate carbon and liquid hydrocarbonaceous fuel, a stream of free-oxygen-containing gas selected from the group consisting of air, oxygen-enriched air i.e. at least 22 mole % oxygen, and substantially pure oxygen i.e. at least 95 mole % oxygen, wherein the ratio of free-oxygen in the free-oxygen containing gas to carbon in the feedstock (O/C atom/atom) is in the range of about 0.6 to 1.5; and a temperature moderator comprising at least a portion of the by-product water produced subsequently in step (3) (a), by partial oxidation at a temperature in the range of about 1300° to 3000° F and a pressure in the range of about 1 to 250 atmospheres thereby producing an effluent gas stream containing $H_2$, CO, $CO_2$, $H_2O$, particulate carbon, and optionally at least one gas from the group $H_2S$, COS, $N_2$, $CH_4$ and A;
   2. cooling the effluent gas stream from (1) to a temperature in the range of about 300° to 900° F but above the dew point of the water in the gas and simultaneously removing said particulate carbon by discharging said effluent gas stream directly into a body of hot immersion fluid contained in a quench zone and comprising a dispersion of liquid hydrocarbonaceous fuel and particulate carbon, wherein said quench zone contains 30 to 60 gallons of immersion fluid maintained at a temperature in the range of about 300° to 850° F for each 1000 Standard Cubic Feet of effluent gas from the gas generator that is quenched therein, and removing from said quench zone a clean gaseous stream comprising $H_2$, CO, $CO_2$, $H_2O$, particulate carbon and optionally at least one material from the group $H_2S$, COS, $N_2$, A, and $C_1$–$C_{10}$ hydrocarbons;
   3. contacting the process gas stream leaving the quench zone in (2) in a gas-liquid contacting zone with a portion of by-product water and optionally cooling the gas stream in a cooling zone to condense out any entrained normally liquid $C_5$–$C_{10}$ hydrocarbons and water, and separating the following streams in a gas-liquid separation zone: (a) by-product water, (b) any light liquid $C_5$–$C_{10}$ hydrocarbons, and (c) clean product gas comprising $H_2$, CO, $CO_2$, and optionally at least one material from the group $H_2S$, COS, $N_2$, A, and $C_1$–$C_4$ hydrocarbons;
   4. recycling separate portions of the by-product water (3) (a) optionally in admixture with make-up water, to the reaction zone of the gas generator in (1) and to the gas-liquid contacting zone in (3);
   5. cooling at least a portion of the hot immersion fluid from (2) to a temperature in the range of about 300° to 850° F. in an external cooler, recycling at least a portion of said cooled immersion fluid to said quench zone; and
   6. introducing a portion of said hot immersion fluid from (2) or a portion of said cooled immersion fluid from (5) into the reaction zone in (1) as at least a portion of said dispersion of particulate carbon in liquid hydrocarbonaceous fuel.

2. The process of claim 1 provided with the additional step of spraying the effluent gas stream from the gas generator with a portion of said immersion fluid prior to quenching said effluent gas stream in said quench zone.

3. The process of claim 1 wherein the clean product gas stream from step (3) contains from about nil to 40.0 mole percent of $C_1$–$C_4$ hydrocarbons.

4. The process of claim 1 wherein said gas-liquid contacting zone in step (3) comprises a nozzle scrubber.

5. The process of claim 1 wherein said liquid hydrocarbonaceous fuel is selected from the group consisting of petroleum distillate and residua, gas oil, residual fuel, reduced crude, whole crude, asphalt, coal tar, coal oil, shale oil, tar sand oil, and mixtures thereof.

6. The process of claim 1 wherein said liquid hydrocarbonaceous fuel is a pumpable slurry of solid carbonaceous fuel.

7. The process of claim 1 wherein said free-oxygen containing gas is selected from the group air, oxygen-enriched air i.e. at least 22 mole % oxygen, and substantially pure oxygen i.e. at least 95 mole % oxygen.

8. The process of claim 1 wherein the weight ratio of temperature moderator to liquid hydrocarbonaceous fuel is in the range of about 0.0 to 3.0.

9. The process of claim 1 wherein the immersion fluid in step (2) is a pumpable dispersion of liquid hydrocarbonaceous fuel and carbon particles in which the solids content is in the range of about nil to 50 weight percent.

10. The process of claim 1 wherein said quench zone contains residual aromatic oil as the immersion fluid and said immersion fluid is maintained at a temperature in the range of about 300° to 500° F. and below the thermal cracking temperature, and at a pressure of at least 1500 psia; and wherein said clean product gas from step (3) contains up to 5 mole % $C_1$–$C_4$ hydrocarbons.

11. The process of claim 1 wherein said product gas contains from 10 to 40 mole % of $C_1$–$C_4$ hydrocarbons and has a gross heating value in the range of about 400 to 800 BTU per Standard Cubic Feet.

* * * * *